3,071,404
EXPLOSIVELY RELEASABLE FASTENER
Austin G. Van Hove, 3856 Gates Place, Riverside, Calif.
Filed Dec. 8, 1960, Ser. No. 74,531
2 Claims. (Cl. 294—83)

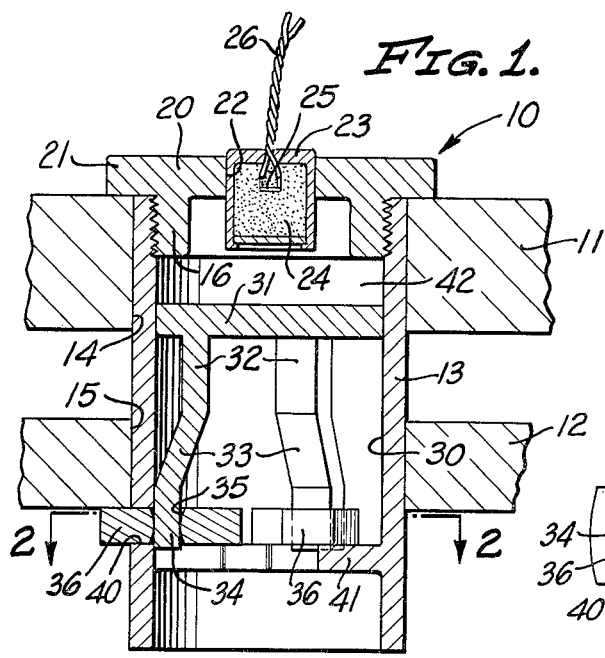
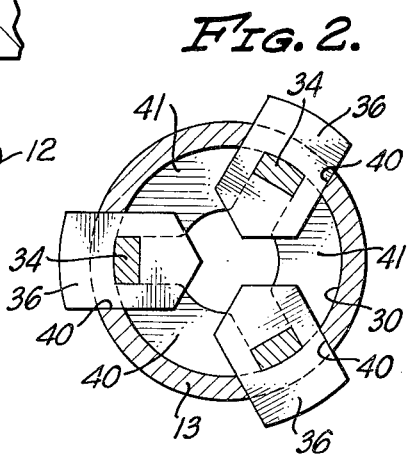
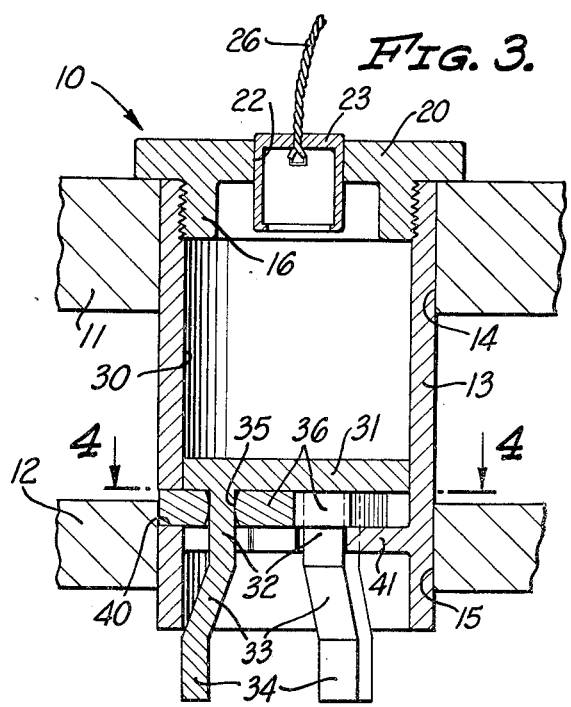
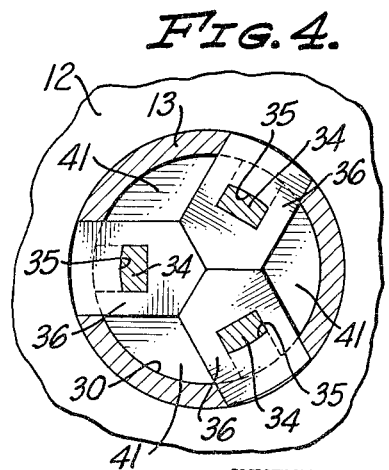
INVENTOR.
AUSTIN G. VAN HOVE
BY
Herbert E. Fidder
AGENT

United States Patent Office 3,071,404
Patented Jan. 1, 1963

The present invention relates to explosively releasable fasteners which can be disconnected or disengaged from the structure with which they are associated, by detonating a small pyrotechnic charge. Fasteners of the type referred to are used to join the several stages of a multi-stage rocket motor together, and as each stage burns out, the fasteners holding it to the stages ahead are actuated by a mechanism in the rocket to release the burned out stage and allow it to drop away from the unused stages, so that the dead weight of the burned out stage will not hold back the succeeding stages. Such devices are also used as safety releases, holding parts together which are separated by remote control so as to permit personnel working on the job to effect such separation from the safety of a remote control point.

Heretofore, explosively releasable fasteners of the type referred to have utilized a charge of explosive within a hollow bolt, which is detonated to burst the bolt. The chief objection to this type of device is that the explosion causes fragmentation of the bolt, which can result in damage to the bodies that were joined by the bolts.

Another form of explosively releasable fastener utilizes balls which are confined within pockets in the sides of the fastener and project outwardly from the sides thereof for a short distance. These balls are backed up by a movable member when the fastener is engaged, and the back-up member is removed by the action of the explosive, allowing the balls to be pushed inwardly within their pockets so as to release the two separable bodies. One disadvantage of this arrangement is that the balls are not positively retracted, but are merely freed to roll inwardly. However, dirt or any other impediment, such as a binding fit of the balls within the pockets, may cause the balls to fail to retract, in which case the fastener will not release. Another disadvantage of this type of fastener is that if the two separable bodies do not part instantaneously, the balls may rebound or otherwise move back into position to relock the bodies, thereby causing complete failure of the releasing function.

The primary object of the present invention is to provide a new and improved releasable fastener of the class described which is self-contained and positive in action.

Another object of the invention is to provide an explosively releasable fastener which is not damaged by the explosive actuation, and is therefore capable of being reloaded and reused.

A further object of the invention is to provide an explosively releasable fastener in which the entire explosive force is confined within the device, and in which the fragmentation of parts is positively prevented, thereby eliminating damage to surrounding structure.

Still another object of the invention is to provide an explosively releasable fastener in which the locking parts are positively retracted and held in the retracted position, so that there is no possibility of the device relocking or failing to release.

The foregoing and other objects and advantages of the present invention will become apparent to those skilled in the art upon consideration of the following detailed description of the preferred embodiment thereof, reference being had to the accompanying drawings, wherein;

FIGURE 1 is a longitudinal sectional view through an explosively releasable fastener embodying the principles of the invention, showing the device in the locked condition;

FIGURE 2 is a transverse sectional view of the same, taken at 2—2 in FIGURE 1;

FIGURE 3 is a view similar to FIGURE 1, showing the device in the unlocked condition; and FIGURE 4 is a transverse sectional view, taken at 4—4 in FIGURE 3.

In the drawings, the releasable fastener of the present invention is designated in its entirety by the reference numeral 10, and is shown joining two separable bodies 11 and 12 together. The fastener 10 includes a tubular shank 13, which is inserted through aligned holes 14 and 15 in the bodies 11 and 12 respectively. At its top end, the tubular shank 13 is threaded internally to receive the threaded flange 16 of a base member 20. The base member 20 closes the top end of the tubular shank 13, and has a radial flange 21 which projects outwardly beyond the shank 13 to engage the body 11 around the margins of the hole 14.

Pressed or screwed into a hole 22 in the center of the base 20 is a primer cup, or squib, 23 loaded with pyrotechnic material 24, which is detonated by a hot wire 25 at the end of a pair of electrical wires 26.

Slidably disposed within the cylindrical bore 30 of the tubular shank 13 is a piston 31 having three equidistantly spaced cam legs 32 projecting downwardly from the underside thereof a short distance in from the periphery of the piston. The legs 32 extend parallel to the longitudinal axis of the bore 30 for a distance, and then incline outwardly at 33 until they reach the surface of the bore 30, at which point they turn to form terminal portions 34 that also extend parallel to the axis of the bore.

The legs 32 extend through apertures 35 in three laterally slidable locking lugs 36, which extend radially from the center of the bore 30. The locking lugs 36 pass through apertures 40 in the sides of the tubular shank 13, and their outer ends overlie the edges of the lower body 12 adjacent the edge of the hole 15. On the inside of the bore 30, the locking lugs 36 are slidably supported on their side edges by three inwardly projecting flanges 41 which are separated from one another by gaps of slightly greater width than the width of the cam legs 32. The apertures 35 in the locking lugs 36 are rounded on their inner and outer edges, as shown in FIGURE 1, to allow the inclined portions 33 of the legs 32 to slide through the openings without binding.

When the fastener 10 is in the locked position with the piston 31 at the top of the bore 30, as shown in FIGURE 1, the lower ends 34 of the cam legs 32 are disposed within the apertures 35 of the locking lugs 36, thereby locating the latter in their radially extended positions. In this condition, the bodies 11 and 12 are positively locked together, and separation of the bodies cannot be effected without shearing off the locking lugs 36 or otherwise destroying the fastener.

Upon detonation of the pyrotechnic material 24, the explosive gases fill the chamber 42 at the top end of the tubular shank 13, driving the piston 31 downwardly with considerable force. As the piston 31 moves downwardly in the bore 30, the inclined portions 33 of the legs 32 enter the apertures 35 and thereby cam the locking lugs 36 inwardly until the lugs 36 are completely retracted, as in FIGURE 3. With the lugs 36 completely retracted, the body 12 is no longer held by the fastener 10, and in FIGURE 3 it is shown pulling away from the body 11. At the very bottom of its travel, the piston 31 abuts against the locking lugs 36, and the parallel top portions of the legs 32 occupy the apertures 35, thereby preventing the locking lugs 36 from moving outwardly to reengage the body 12.

As best shown in FIGURES 2 and 4, the inner ends of the locking lugs 36 are cut off at an angle on both sides of the centerline, so that the three lugs come together in the center of the bore 30. The outer ends of the locking lugs 36 are rounded to the same diameter as the outside diameter of the shank 13, and when the three lugs are fully retracted, their outer ends lie flush with or slightly within the outer surface of the shank.

While I have shown and described in considerable detail what I believe to be the preferred form of my invention, it will be understood by those skilled in the art that various changes may be made in the shape and arrangement of the several parts without departing from the broad scope of the invention, as defined in the following claims.

I claim:

1. An explosively releasable fastener for joining two separable bodies together, said fastener comprising a tubular shank having one end closed and means at said one end for engaging one of said bodies so as to prevent relative movement therebetween in at least one direction, a plurality of angularly spaced flanges projecting horizontally inward from the wall of said tubular shank in a plane disposed perpendicular to the axis of said shank and spaced from said one end, a plurality of radially extending locking lugs slidably supported on adjacent ends of adjoining pairs of said flanges, each of said locking lugs projecting through an aperture in the side of said shank and being slidable therethrough between an extended locking position and a retracted unlocked position, the outer end of said locking lug projecting beyond the outer surface of said tubular shank when in said extended locking position and engaging the other of said bodies so as to prevent separation of the latter from said one body, a piston member slidable longitudinally within said tubular shank between said closed one end and said flanges, a plurality of angularly spaced cam legs projecting from one side of said piston member, each of said cam legs sliding through an aperture in one of said locking lugs and passing between adjacent ends of adjoining pairs of said flanges, each of said legs having at least a portion thereof inclined outwardly with respect to the line of travel of said piston member, whereby movement of said piston member away from said closed one end of said tubular shank causes said locking lugs to be retracted from said locking position to said unlocked position, and a pyrotechnic charge mounted within said tubular shank between said closed one end and said piston member, said pyrotechnic charge being operable, when detonated, to drive said piston member away from said closed one end of said tubular shank and thereby retract said locking lugs.

2. An explosively releasable fastener, as defined in claim 1, wherein each of said cam legs is bent to provide terminal portions which are parallel to the line of travel of said piston member, and an intermediate, outwardly inclined portion which is operable to retract said locking legs when said piston member moves away from said closed one end of said tubular shank, said terminal portions of said cam legs serving to lock said lugs in either of said extended or retracted positions.

References Cited in the file of this patent

UNITED STATES PATENTS

| | | |
|---|---|---|
| 2,489,984 | Shoemaker | Nov. 29, 1949 |
| 2,949,822 | Musser | Aug. 23, 1960 |